(12) United States Patent
Wu et al.

(10) Patent No.: US 11,126,194 B2
(45) Date of Patent: Sep. 21, 2021

(54) IN-VEHICLE DISPLAY SYSTEM, TRAFFIC EQUIPMENT AND THE IMAGE DISPLAY METHOD

(71) Applicant: BOE TECHNOLOGY GROUP CO., LTD., Beijing (CN)

(72) Inventors: Naifu Wu, Beijing (CN); Dianmeng Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 429 days.

(21) Appl. No.: 15/951,784

(22) Filed: Apr. 12, 2018

(65) Prior Publication Data

US 2018/0373262 A1    Dec. 27, 2018

(30) Foreign Application Priority Data

Jun. 27, 2017    (CN) .......................... 201710499934.8

(51) Int. Cl.
*G02B 27/01*    (2006.01)
*G05D 1/02*    (2020.01)
(Continued)

(52) U.S. Cl.
CPC ............ *G05D 1/0246* (2013.01); *G01W 1/02* (2013.01); *G02B 27/0101* (2013.01);
(Continued)

(58) Field of Classification Search
None
See application file for complete search history.

(56) References Cited

U.S. PATENT DOCUMENTS

| 5,140,465 A * | 8/1992 | Yasui ..................... G02B 27/01 359/631 |
| 5,231,379 A * | 7/1993 | Wood ..................... G02B 27/01 340/980 |

(Continued)

FOREIGN PATENT DOCUMENTS

| CN | 102224443 A | 10/2011 |
| CN | 102656501 A | 9/2012 |

(Continued)

OTHER PUBLICATIONS

The First Chinese Office Action dated Feb. 22, 2019; Appln. No. 201710499934.8.

(Continued)

*Primary Examiner* — Dorothy Harris

(57) ABSTRACT

An in-vehicle display system, a traffic equipment and an image display method are disclosed. The in-vehicle display system includes an image generation device, an intermediate image receiving part and a controller. The image generation device is configured to project projection light of a first image; the intermediate image receiving part is configured to receive the projection light of the first image, so as to present the first image, and the intermediate image receiving part is further configured to have a changeable intermediate image receiving position; the controller is configured to control the intermediate image receiving position of the intermediate image receiving part at least based on a current driving speed so as to present the first image at a corresponding position.

19 Claims, 4 Drawing Sheets

(51) Int. Cl.
  *G05D 13/66*   (2006.01)
  *G01W 1/02*   (2006.01)
(52) U.S. Cl.
  CPC ..... *G05D 13/66* (2013.01); *G02B 2027/0145* (2013.01); *G03H 2225/30* (2013.01); *G05D 2201/0213* (2013.01)

(56) References Cited

U.S. PATENT DOCUMENTS

| | | | |
|---|---|---|---|
| 6,429,789 B1* | 8/2002 | Kiridena | B60R 1/00 340/905 |
| 6,708,087 B2* | 3/2004 | Matsumoto | G01C 21/365 701/1 |
| 8,653,961 B2* | 2/2014 | Kumon | G02B 27/01 340/441 |
| 9,809,165 B1* | 11/2017 | Misu | B60Q 9/00 |
| 9,946,078 B2 | 4/2018 | Watanabe et al. | |
| 2010/0253540 A1* | 10/2010 | Seder | G01S 13/867 340/905 |
| 2011/0199198 A1* | 8/2011 | Yang | G02B 27/01 340/426.25 |
| 2011/0227717 A1* | 9/2011 | Kumon | G02B 27/01 340/441 |
| 2012/0098819 A1 | 4/2012 | Furuya et al. | |
| 2012/0224062 A1* | 9/2012 | Lacoste | G02B 27/01 348/148 |
| 2012/0250306 A1 | 10/2012 | Sugiyama et al. | |
| 2015/0234458 A1* | 8/2015 | Hsieh | B60K 35/00 345/156 |
| 2016/0124231 A1* | 5/2016 | Watanabe | B60K 35/00 359/633 |
| 2016/0216521 A1 | 7/2016 | Yachida et al. | |
| 2017/0212347 A1* | 7/2017 | Uragami | G02B 27/0149 |
| 2017/0220106 A1* | 8/2017 | Tomiyama | G09G 3/36 |
| 2017/0336797 A1* | 11/2017 | Abe | G05D 1/0212 |
| 2018/0011314 A1* | 1/2018 | Quiroz de la Mora | G02B 27/0101 |
| 2018/0024357 A1 | 1/2018 | Yamamoto | |
| 2018/0270542 A1* | 9/2018 | Ramalingam | B60K 35/00 |
| 2018/0306597 A1* | 10/2018 | Kosaka | G01C 21/365 |
| 2018/0321491 A1* | 11/2018 | Kuo | G02B 27/0103 |
| 2018/0373030 A1* | 12/2018 | Kusanagi | G09G 5/00 |

FOREIGN PATENT DOCUMENTS

| | | |
|---|---|---|
| CN | 105283794 A | 1/2016 |
| CN | 105682973 A | 6/2016 |
| CN | 107656370 A | 2/2018 |
| WO | 2017/061019 A1 | 4/2017 |
| WO | 2017/064797 A1 | 4/2017 |

OTHER PUBLICATIONS

The Second Chinese Office Action dated Aug. 1, 2019; Appln. No. 201710499934.8.

* cited by examiner

IN-VEHICLE DISPLAY SYSTEM, TRAFFIC EQUIPMENT AND THE IMAGE DISPLAY METHOD

CROSS-REFERENCE TO RELATED APPLICATION

The present application claims priority to Chinese patent application No. 201710499934.8, filed on Jun. 27, 2017, the entire disclosure of which is incorporated herein by reference as part of the present application.

TECHNICAL FIELD

Embodiments of the present disclosure relate to an in-vehicle display system, a traffic equipment and an image display method.

BACKGROUND

Head-up Display (HUD) is an in-vehicle display system, which is capable of displaying vehicle information (for example, vehicle speed, oil capacity and the like) and indication information (for example, navigation, hazard warning and the like) at a proper position in front of a driver, such that relevant information such as speed, oil capacity and the like can be obtained without deviating sight line of the driver from the road ahead.

SUMMARY

At least one embodiment of the present disclosure provides an in-vehicle display system. The in-vehicle display system comprises an image generation device, an intermediate image receiving part and a controller. The image generation device is configured to project projection light of a first image; the intermediate image receiving part is configured to receive the projection light of the first image, so as to present the first image, and the intermediate image receiving part is further configured to have a changeable intermediate image receiving position; the controller is configured to control the intermediate image receiving position of the intermediate image receiving part at least based on current driving speed, so as to present the first image at a corresponding position.

For example, in the in-vehicle display system provided by at least one embodiment of the present disclosure, the controller is configured to control the intermediate image receiving position of the intermediate image receiving part at least based on the current driving speed, a current weather condition and a current road condition.

For example, the in-vehicle display system provided by at least one embodiment of the present disclosure further comprises an image transmission device. The image transmission device is configured to transfer the first image to a viewing position of a user.

For example, in the in-vehicle display system provided by at least one embodiment of the present disclosure, an imaging position of the image generation device is adjustable.

For example, in the in-vehicle display system provided by at least one embodiment of the present disclosure, the image generation device comprises a spatial light modulator and a coherent light source. The spatial light modulator is configured to generate a hologram corresponding to the first image to be displayed; the coherent light source is configured to allow output light of the coherent light source to be incident onto the spatial light modulator, so as to generate the first image at the intermediate image receiving position based on diffraction effect of the hologram.

For example, in the in-vehicle display system provided by at least one embodiment of the present disclosure, the intermediate image receiving part comprises an image receiving plate; the controller is further configured to change the intermediate image receiving position through changing a position of the image receiving plate.

For example, the in-vehicle display system provided by at least one embodiment of the present disclosure further comprises a plane mirror, the plane mirror is arranged in a transmission path of the first image, and is configured to reflect light of the first image received by the plane mirror onto the image transmission device.

For example, in the in-vehicle display system provided by at least one embodiment of the present disclosure, the image transmission device is configured to change a distance between the user and the first image viewed by the user based on an optical distance between the image transmission device and the intermediate image receiving position.

For example, in the in-vehicle display system provided by at least one embodiment of the present disclosure, the image transmission device comprises at least one concave mirror.

For example, in the in-vehicle display system provided by at least one embodiment of the present disclosure, the image transmission device further comprises a partially reflective and partially transparent element; the partially reflective and partially transparent element is configured to transfer the first image outputted by the concave mirror to the viewing position of the user.

At least one embodiment of the present disclosure further provides a traffic equipment, which comprises the in-vehicle display system provided by any embodiment of the present disclosure. The controller is further configured to obtain the current driving speed.

At least one embodiment of the present disclosure further provides an image display method, which comprises: projecting projection light of a first image; receiving the projection light of the first image at changeable intermediate image receiving position, so as to present the first image; controlling the intermediate image receiving position at least based on current driving speed, so as to present the first image at a corresponding position.

For example, in the image display method provided by at least one embodiment of the present disclosure, the intermediate image receiving position is controlled at least based on the current driving speed, a current weather condition and a current road condition.

For example, the image display method provided by at least one embodiment of the present disclosure further comprises: transferring the first image presented at the intermediate image receiving position to a viewing position of a user.

For example, the image display method provided by at least one embodiment of the present disclosure further comprises: changing the intermediate image receiving position through changing a position of an intermediate image receiving part.

At least one embodiment of the present disclosure further provides an in-vehicle display system, which comprises: an image generation device, an intermediate image receiving part, a processor, and a memory. The memory is stored with computer program instructions executable by the processor, upon the processor running the computer program instructions, the in-vehicle display system performs a following method comprising: controlling the image generation device to project projection light of a first image; controlling the intermediate image receiving part to receive the projection light of the first image at changeable intermediate image receiving position, so as to present the first image; and controlling the intermediate image receiving position of the intermediate image receiving part at least based on current driving speed, so as to present the first image at a corresponding position.

For example, in the in-vehicle display system provided by at least one embodiment of the present disclosure, the intermediate image receiving position of the intermediate image receiving part is controlled at least based on the current driving speed, a current weather condition and a current road condition.

For example, the in-vehicle display system provided by at least one embodiment of the present disclosure further comprises an image transmission device. Upon the processor running the computer program instructions, the in-vehicle display system performs a following method further comprising: controlling the image transmission device, so as to transfer the first image to a viewing position of a user.

BRIEF DESCRIPTION OF THE DRAWINGS

In order to clearly illustrate the technical solution of the embodiments of the disclosure, the drawings used in the description of the embodiments or relevant technologies will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
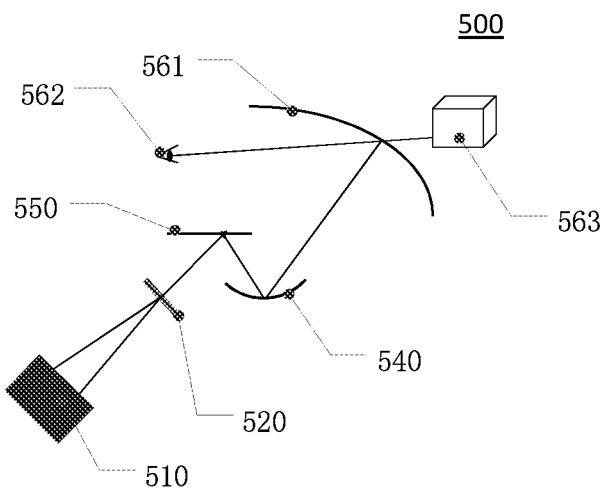
FIG. 1 is a schematic diagram of an in-vehicle display system.

For example, FIG. 1 is a schematic diagram of an in-vehicle display system 500; as illustrated in FIG. 1, the in-vehicle display system 500 comprises an image generation device 510, an image receiving plate 520, an image transmission device 540 and a plane mirror 550. For example, the image generation device 510 illustrated in FIG. 1 has an imaging distance of fixed value (i.e., fixed imaging distance), and the image receiving plate 520 is provided at the imaging distance of the image generation device 510 so as to receive an image projected by the image generation device 510. For example, the light of the image projected by the image generation device 510 can be incident onto the image transmission device 540 through the reflection by the plane mirror 550, and then be transferred to a viewing position 562 for a user through the reflection by the front window 561 of the vehicle provided with this in-vehicle display system. For example, the image transmission device 540 can comprise a concave mirror. For example, in a case that the image transmission device 540 is a concave mirror, when an optical distance between the image receiving plate 520 and the concave mirror is smaller than a focal length of the concave mirror, the user can observe an upright virtual image 563. For example, in a case that a plane mirror 550 is provided in the in-vehicle display system 500, an optical distance between the image receiving plate 520 and the concave mirror is equal to the sum of a distance between an image output position of the image receiving plate 520 and an image input position of the plane mirror 550 and a distance between an image output position of the plane mirror 550 and an image input position of the concave mirror.

The inventors of the present disclosure note that the in-vehicle display system 500 illustrated in FIG. 1 can only display an image at a fixed position in front of the driver because the imaging distance of the image generation device 510 of the in-vehicle display system 500 is of a fixed value and the position of the image receiving plate 520 is unchanged.

The inventors of the present disclosure further note that, in a case that vehicle speed, weather condition or road condition varies, the driver may change his/her vision focus position, that is, the distance between the vision focus position of the driver and the position of the driver can be varied with the vehicle speed, the weather condition or the road condition. For example, in a case that the vehicle speed is increased, the vision of the driver generally is focused on objects located at a longer distance in front of him/her (for example, objects located at a braking distance). For another example, in a case that the road is in a traffic congestion state, the distance between the vehicle driven by the driver and the vehicle ahead is short, so the vision of the driver is focused on objects located at a shorter distance in front of him/her (for example, at the rear side of the vehicle ahead). For example, in a case that the imaging position of the in-vehicle display system is located at a fixed position in front of the driver, the driver has to adjust the vision focus position frequently; for example, in a case that the images displayed by the in-vehicle display system needed to be viewed, the driver need to adjust the vision to a fixed image display position; for another example, in a case that road conditions in front of the vehicle needed to be viewed, the driver need to adjust the vision to a specific position in front of the vehicle. Therefore, in a case that the in-vehicle display system has a fixed imaging position while the displayed information and road conditions need to be viewed, the driver has to change the vision focus positions. However, frequent adjustments of the vision focus positions not only make eyestrain occur easily, but also lower down the driving safety. Therefore, an in-vehicle display system which can control the image display position at a time according to the current vehicle speed of a vehicle at the time is needed.

Embodiment of the present disclosure provides an in-vehicle display system, a traffic equipment and an image display method, and accordingly the driving safety is improved through controlling of the image display position at least based on a current driving speed of a vehicle.

At least one embodiment of the present disclosure provides an in-vehicle display system. The in-vehicle display system comprises an image generation device, an intermediate image receiving part, and a controller. The image generation device is configured to project projection light of a first image; the intermediate image receiving part is configured to receive the projection light of the first image so as to present the first image (i.e., allowing the first image to be seen by a user), and the intermediate image receiving part is further configured to have a changeable intermediate image receiving position; and the controller is configured to control the intermediate image receiving position of the intermediate image receiving part at least based on a current driving speed so as to present the first image at a corresponding position.

At least one embodiment of the present disclosure further provides a traffic equipment, which comprises the in-vehicle display system provided by any embodiment of the present disclosure. The controller is further configured to obtain the current driving speed.

At least one embodiment of the present disclosure further provides an image display method, which comprises: projecting projection light of a first image; receiving the projection light of the first image at changeable intermediate image receiving position, so as to present the first image; and controlling the intermediate image receiving position at least based on a current driving speed so as to present the first image at a corresponding position.

At least one embodiment of the present disclosure further provides an in-vehicle display system, which comprises: an image generation device, an intermediate image receiving part, a processor, and a memory. The memory is stored with computer program instructions executable by the processor, upon the processor running the computer program instructions, the in-vehicle display system performs a following method comprising: controlling the image generation device to project projection light of a first image; controlling the intermediate image receiving part to receive the projection light of the first image at a changeable intermediate image receiving position, so as to present the first image; and controlling the intermediate image receiving position of the intermediate image receiving part at least based on a current driving speed, so as to present the first image at a corresponding position.

In the following, the in-vehicle display system, the traffic equipment and the image display method according to the embodiments of the disclosure is described with reference to a plurality of embodiments.

First Embodiment

Figure 2A:
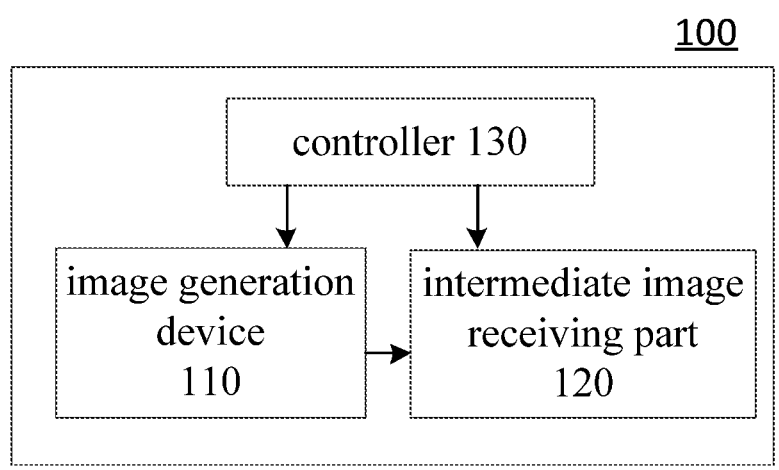
FIG. 2A is an exemplary block diagram of an in-vehicle display system provided by a first embodiment.
Figure 2B:
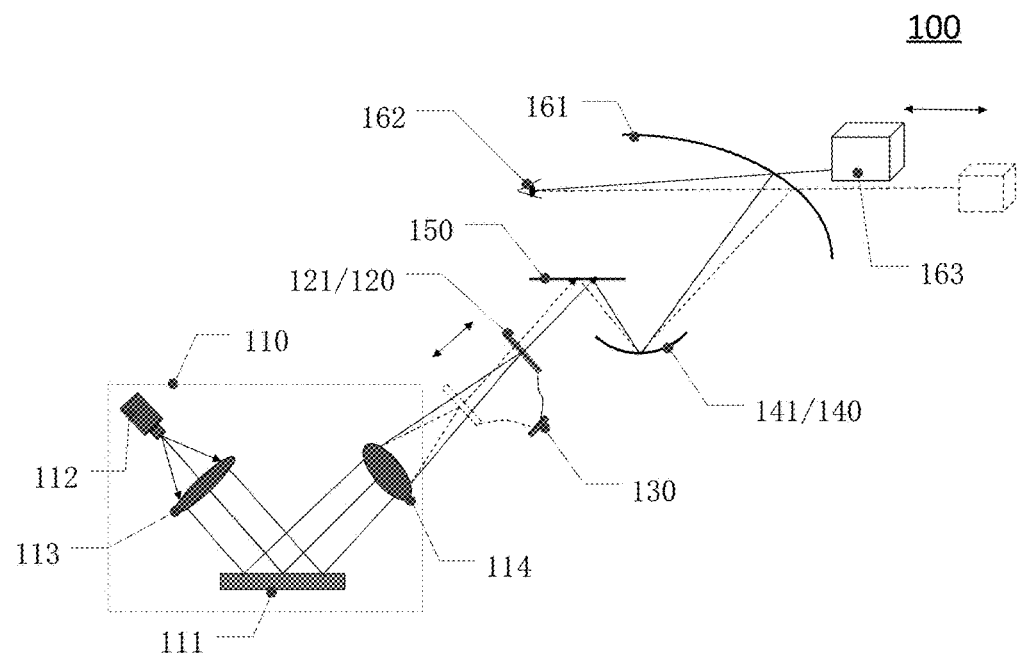
FIG. 2B is an exemplary structure diagram of the in-vehicle display system illustrated in FIG. 2A.

The present embodiment provides an in-vehicle display system 100, the in-vehicle display system 100 can control an image display position 163 at least based on current driving speed (for example, vehicle speed), for example, control an image display position 163 in a real time mode at least based on the current driving speed at the same moment. For example, FIG. 2A is an exemplary block diagram of the in-vehicle display system 100 provided by the first embodiment; FIG. 2B is an exemplary structure diagram of the in-vehicle display system illustrated in FIG. 2A. For example, as illustrated in FIG. 2A and FIG. 2B, the in-vehicle display system 100 can comprise an image generation device 110, an intermediate image receiving part 120 and a controller 130. For example, the in-vehicle display system 100 can further comprise an image transmission device 140.

For example, the image generation device 110 can configured to project projection light of a first image. For example, the image generation device 110 can project the projection light of the first image at a changeable position, that is, an imaging position of the image generation device 110 is adjustable, or the image generation device 110 can project the projection light of the first image at a corresponding position. For example, the first image can comprise vehicle information such as vehicle speed, oil capacity and the like; for another example, the first image can further comprise indication information such as navigation, hazard warning and the like, but the present embodiment is not limited to the above-mentioned examples of the first image. For example, the specific method to achieve adjustable imaging position by the image generation device 110 can be set in actual implementations, and no specific limitations will be given in this aspect in the embodiment of the present disclosure.

For example, an exemplary arrangement of the image generation device 110 will be described in detail with reference to FIG. 2B in the following.

For example, the image generation device 110 can achieve an adjustable imaging position through computer generated holography technology. For example, as illustrated in FIG. 2B, the image generation device 110 can comprise a spatial light modulator 111 and a coherent light source 112. For example, the image generation device 110 can generate the first image through performing wavefront modulation (for example, amplitude modulation or/and phase modulation) to light outputted by the coherent light source 112 with the spatial light modulator 111.

For example, the coherent light source 112 in the present embodiment is a light source with certain coherence. For example, the coherent light source 112 can be a laser source with strong coherence; for another example, the coherent light source 112 can also be LED light source (i.e., light-emitting diode) with weak coherence, and no specific limitations will be given in this aspect in the present embodiment. For example, color of light outputted by the coherent light source 112 can be set according to specific implementation demands, the coherent light source 112 for example can comprise laser sources of red, green and blue color, such that the first image displayed by the image generation device 110 can be a colored image, but the present embodiment is not limited thereto.

For example, based on a first image to be displayed, the spatial light modulator 111 can be configured to generate (or load) a hologram corresponding to the first image to be displayed. For example, the hologram loaded on the spatial light modulator 111 can comprise intensity distribution information of the first image, that is, information relevant to the content of the first image to be displayed. For another example, the hologram loaded on the spatial light modulator 111 can further comprise depth information of the first image to be displayed, that is, information relevant to the imaging position of the first image. For example, the specific method to load the intensity distribution information and the depth information of the first image to be displayed onto the spatial light modulator 111 can refer to the general computer generated holography technology; no further descriptions will be given herein.

For example, the spatial light modulator 111 can be a phase only spatial light modulator, but the present embodiment is not limited thereto. For example, the phase only spatial light modulator can modulate the phase of the light incident onto it without changing amplitude of the light, so as to increase diffraction efficiency of the hologram generated by the spatial light modulator 111. For example, the phase only spatial light modulator 111 can be a phase-only LCoS device (i.e., liquid crystal on silicon device) but the present embodiment is not limited thereto. For example, in a case that the spatial light modulator 111 is a phase only spatial light modulator 111, the hologram loaded on the spatial light modulator 111 is a kinoform (i.e., phase hologram), and the kinoform can realize different phase delays for the light incident onto it, such that phase modulation to the incident light can be realized.

For example, in a case that the light outputted by the coherent light source 112 is incident onto the spatial light modulator 111, the hologram, which is generated by the spatial light modulator 111 and corresponds to the first image to be displayed, can generate the first image at a pre-determined position based on diffraction effect, and the pre-determined position corresponds to the depth information comprised by the hologram loaded on the spatial light modulator 111. For example, in a case that the first images are need to be displayed at different locations at different times, the holograms loaded at different times on the spatial light modulator 111 can comprise different depth information, such that the first image can be generated (i.e., displayed) at a changeable imaging position (that is, at the intermediate image receiving position of the intermediate image receiving part 120) over time.

For example, according to actual implementation demands, the image generation device 110 can further comprise a first lens 113 and a second lens 114. For example, in a case that the coherent light source 112 is a non-collimated light source, the first lens 113 can align the light outputted by the coherent light source 112 into collimated light. For example, the second lens 114 can be configured for eliminating a conjugate image in coaxial holography when working in conjunction with a filter (not illustrated in FIG. 2B).

For example, the image generation device 110 provided by the present embodiment is not limited to the structure as illustrated in FIG. 2B. For example, the image generation device 110 can also realize an adjustable imaging position through the following method, that is, aligning divergent image light of conventional image source into collimated image light, so as to receive images at a corresponding position, such that an adjustable imaging position can be realized.

For example, the image generation device 110 can also be a micro-projector of various types; the image generation device 110 can comprise a display chip and a lighting assembly (for example, light source). Light outputted by the light source can be incident onto the display chip homogeneously after transmitting through a series of optical devices; a display signal can generate color gradient and grey scale through a circuit system such that images can be displayed; a projection lens can enlarge the image displayed by the display chip and project it onto the intermediate image receiving part. The light source can be a light-emitting diode (LED) or/and laser source. For example, the display chip can be LCoS chip (i.e., liquid crystal on silicon chips) or DLP (digital light processing) chip. DLP projection technology can adopt a digital micromirror device (DMD) as a key processing component to realize digital light processing.

For example, the intermediate image receiving part 120 is configured to receive the projection light of the first image so as to present the first image, and the intermediate image receiving part is further configured to have a changeable intermediate image receiving position. For example, the specific arrangement of the intermediate image receiving part 120 can be set according to specific implementation demands, and no specific limitations will be given to the embodiments of the present application.

Figure 3A:
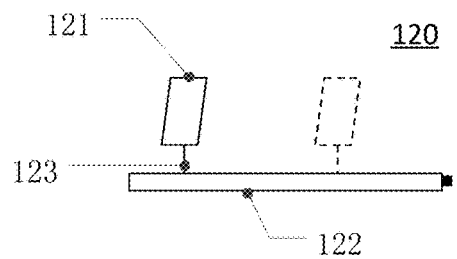
FIG. 3A is an exemplary arrangement of an intermediate image receiving part.

For example, as illustrated in FIG. 3A, the intermediate image receiving part 120 can comprise an image receiving plate 121, and the position of the image receiving plate 121 is adjustable. For example, the intermediate image receiving part 120 can further comprise a mounting seat 123 and a translation device 122 (for example, an electric rail). For example, the image receiving plate 121 can be provided on the mounting seat 123, the mounting seat 123, for example, can be moved (for example, moved linearly) on the electric rail when driven by a motor in connection with the electric rail, such that the image receiving plate 121 can receive the projection light of the first image at a changeable intermediate image receiving position, that is, the image receiving plate 121 can present the first image at a changeable intermediate image receiving position. For example, the image receiving plate 121 can comprise a diffusion plate, the diffusion plate for example can comprise thin plate with a scattering surface (i.e., a surface that can scatter light that is incident onto the surface) or comprise a lens array, but the embodiment of present disclosure is not limited thereto.

Figure 3B:
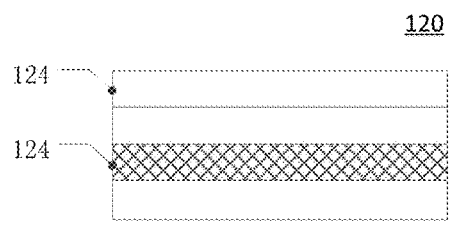
FIG. 3B is another exemplary arrangement of an intermediate image receiving part.
Figure 3C:
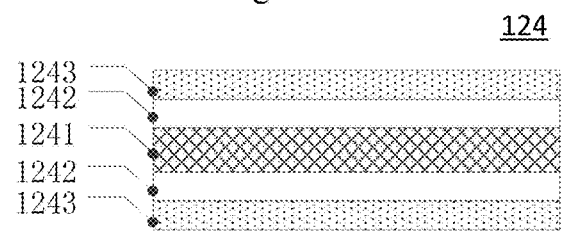
FIG. 3C is an exemplary structure diagram of an image receiving element.

For example, the intermediate image receiving part 120 is not limited to the structure illustrated in FIG. 2B and FIG. 3A. For example, the intermediate image receiving part 120 can also be implemented by a structure illustrated in FIG. 3B. For example, as illustrated in FIG. 3B, the intermediate image receiving part 120 can further comprise image receiving elements 124 that are superimposed together. For example, as illustrated in FIG. 3C, the image receiving element 124 illustrated in FIG. 3C can comprise a polymer dispersed liquid crystal (PDLC) layer 1241, transparent conductive layers 1242 provided at both sides of the polymer dispersed liquid crystal layer 1241, and insulation substrates 1243 each provided at a side of the adjacent transparent conductive layer 1242 far away from the polymer dispersed liquid crystal layer 1241.

For example, in a case that voltage is applied across the polymer dispersed liquid crystal layer 1241 through the transparent conductive layers 1242 provided at both sides of the polymer dispersed liquid crystal layer 1241, the image receiving element 124 is in a state of transmitting light, that is, light incident onto the image receiving element 124 can transmit through the image receiving element 124; in a case that voltage is not applied across the polymer dispersed liquid crystal layer 1241, the image receiving element 124 can scatter light of an image (for example, first image) to be displayed incident onto the image receiving element, that is, the image to be displayed can be presented on the image receiving element 124, in such a case, the image receiving element 124 can be implemented as the image receiving plate 121 illustrated in FIG. 3A.

For example, for the intermediate image receiving part 120 illustrated in FIG. 3B, in a case that one of the image receiving elements 124 is not applied with a driving voltage while the rest of the image receiving elements 124 are applied with driving voltages, the image to be displayed can be presented (i.e., can be seen by a user) at a location where the image receiving element 124 being not applied with the driving voltage is located, such that the intermediate image receiving part 120 with an adjustable intermediate image receiving position can be realized through controlling the way of applying voltage (i.e., controlling which one of the image receiving elements 124 is not applied with a driving voltage so as to present the image).

For example, the intermediate image receiving position of the intermediate image receiving part 120 can be controlled by the controller 130. For example, in a case that the intermediate image receiving part 120 comprises a movable image receiving plate 121 (for example, as illustrated in FIG. 3A), the controller 130 can be configured to change the intermediate image receiving position of the intermediate image receiving part 120 through changing the position of the image receiving plate 121; for another example, in a case that the intermediate image receiving part 120 comprises superimposed image receiving elements 124 (for example, as illustrated in FIG. 3B), the controller 130 can be configured to change the intermediate image receiving position of the intermediate image receiving part 120 through controlling the way of applying voltage.

For example, as illustrated in FIG. 2B the in-vehicle display system 100 further comprises a plane mirror 150. For example, the plane mirror 150 can be arranged in a transmission path of the first image, and can be configured to reflect light of the first image received by the plane mirror onto the image transmission device 140. For example, the plane mirror 150 can fold optical path of the in-vehicle display system 100, such that the in-vehicle display system 100 can be compact.

For example, as illustrated in FIG. 2B, the in-vehicle display system 100 further comprises an image transmission device 140. For example, the image transmission device 140 can be configured to transfer the first image (for example, through secondary imaging) to a viewing position 162 of the user of the vehicle provided with the in-vehicle display system. For example, the first image displayed by the image generation device 110 can be incident onto the image transmission device 140 through reflecting of the plane mirror 150, and then be transferred to a viewing position 162 of the user through reflecting of the front window 161 of the vehicle.

For example, the specific arrangement or configuration of the image generation device 110 can be set according to specific implementation demand; no specific limitations will be given in the embodiments of the present disclosure. For example, the image transmission device 140 can comprise a concave mirror 141. For example, in a case that the image transmission device 140 is a concave mirror 141, when an optical distance between the intermediate image receiving position of the intermediate image receiving part 120 and the concave mirror 141 is smaller than the focal length of the concave mirror, the user can observe an upright virtual image 163. For example, according to imaging characteristics of the concave mirror 141, the imaging distance of the concave mirror 141 is increased along with the increase of the optical distance between the intermediate image receiving position of the intermediate image receiving part 120 and the concave mirror 141, that is, the greater the optical distance between the intermediate image receiving position of the intermediate image receiving part 120 and the concave mirror 141, the greater the distance between the first image observed by the user and the position of the user.

For example, in an example, the image transmission device 140 can further comprise a partially reflective and partially transparent element (not illustrated in FIG. 2B), the partially reflective and partially transparent element, for example, can be arranged at the region of the front window 161 of the vehicle corresponding to the incident region of the light of the intermediate image, such that the partially reflective and partially transparent element can transfer the image outputted by the concave mirror 141 to the viewing position 162 of the user. For example, the reflectivity of the partially reflective and partially transparent element to the light of the first image is larger than the reflectivity of the front window 161 of the vehicle to the light of the first image, so as to transfer more light of the first image to the viewing position 162 of the user, such that the user can observe the first image with a better effect. The partially reflective and partially transparent element is a partially reflective and partially transparent mirror for example.

For example, in order to present the first image in FIG. 2B with a better effect, the depth of the first image is exaggerated in FIG. 2B, such that the first image looks like a three dimensional (3D) image, however, in an actual implementation, the first image can be a two dimensional (2D) image.

For example, the image generation device 110 is not limited to the concave mirror 141 illustrated in FIG. 2B, the image generation device 110 can be in another form in an actual implementation, as long as the image transmission device 140 can be configured to change the distance between the first image observed by the user and the position of the user based on the optical distance between the optical distance between the image transmission device 140 and the intermediate image receiving position.

For example, the controller 130 is configured to change the intermediate image receiving position of the intermediate image receiving part 120 at least based on the current driving speed, so as to present the first image at a different corresponding position for the user to observe the first image better, and for example, based on different current speeds, to present the first image at different corresponding positions for the user to observe the first image better. For example, the specific method adopted by the controller 130 to determine the intermediate image receiving position of the intermediate image receiving part 120 can be set according to specific implementation demands, and no specific limitations will be given to the embodiment of the present disclosure.

For example, the controller 130 can be configured to determine a safe distance and the intermediate image receiving position of the intermediate image receiving part 120 based on the current driving speed. For example, in a case that the current driving speed is increased, the controller 130 can increase the optical distance between the intermediate image receiving position of the intermediate image receiving part 120 and the image transmission device 140 accordingly, so as to increase the distance between the first image observed by the user and the position of the user, such that frequent adjustment of vision focus position of the driver can be avoided, and driving safety can be improved.

For example, in order to further improve the driving safety, the controller 130 can be further configured to control the intermediate image receiving position of the intermediate image receiving part 120 based on the current driving speed and the current weather condition at the same time. For example, in a case that the information of the current driving speed and the current weather condition is obtained, the braking distance or the safe distance of the vehicle can be obtained.

For example, a braking distance S can comprise a reaction distance $S_1$ and a stopping distance $S_2$. The reaction distance is the distance traveled by the vehicle during the time period after an emergency is noticed by the driver and before the braking system starts to work. The stopping distance is the distance traveled by the vehicle during the time period after the braking system starts to work and before the vehicle is completely stopped. For example, the braking distance or the safe distance can be calculated by the following method.

For example, during the time period after an emergency is noticed by the driver and before the braking system starts to work, the vehicle travels with a constant velocity, and therefore, the reaction distance $S_1 = V \times (T_1 + T_2)$, where V is a velocity (or speed) of the vehicle, $T_1$ is a reaction time period of the driver, that is, the time period after an emergency is noticed and before the braking system starts to work, $T_2$ is a reaction time period of the braking system of the vehicle, that is, the time period after the brake is applied and before the braking system starts to work.

For example, during the time period after the braking system starts to work and before the vehicle is completely stopped, the vehicle is experience a uniformly decelerated motion, therefore, the stopping distance $S_2 = \frac{1}{2} \times V \times T_3$, where $T_3$ is the time period after the braking system starts to work and before the vehicle is completely stopped. For example, $T_3$ can be obtained through momentum theorem and relationship between the momentum and applied force in physics, that is, $M \times V = F \times T_3$ in which F is the applied force, and $F = M \times g \times k + F_0$, M is the total weight of the vehicle, g is the acceleration of gravity, k is the friction coefficient, $F_0$ is the additional braking force provided by the vehicle brake system, $T_3 = (M \times V)/(M \times g \times k + F_0)$. Therefore, the following equations regarding the stopping distance Stand the braking distance S can be obtained: $S_2 = (\frac{1}{2} \times V^2)/(g \times k + F_0/M)$; $S = V \times (T_1 + T_2) + (\frac{1}{2} \times V^2)/(g \times k + F_0/M)$.

For example, the speed V of the vehicle, the additional braking force $F_0$ provided by the braking system of the vehicle, the total weight M of the vehicle, the reaction time period of the braking system of the vehicle $T_2$ can be obtained through, for example, the controller 130 (for example, computer). For example, the reaction time period $T_1$ of the driver can adopt average reaction time periods of drivers. For another example, the reaction time period $T_1$ of the driver can be set and uploaded into the controller 130 according to the actual reaction time period of a current driver of the vehicle at a time.

For example, the friction coefficient k can be obtained according to the current weather condition, in a case that the current weather condition is sunny day, rainy day, snow or ice road, the friction coefficient k, for example, can be respectively set as 0.8, 0.4, 0.28 and 0.18, but the embodiment of present disclosure is not limited thereto. For example, the current weather condition can be inputted into the controller 130 manually, or can be obtained and updated by automatically searching over the Internet by the controller 130 according to the current location of the vehicle, but the embodiment of present disclosure is not limited thereto.

For another example, the friction coefficient k also can be obtained according to current weather condition, actual road condition, and current tire condition of the vehicle during driving of the vehicle; for example, in a case that the current weather condition is sunny day and the use time of the tires of the vehicle is smaller than one year, if the vehicle runs on the asphalt road, the friction coefficient k is set to be 0.8, or if the vehicle runs on the cement road, the friction coefficient k is set to be 0.75, but the embodiments of present disclosure are not limited thereto; in a case that the current weather condition is sunny day and the use time of the tires of the vehicle is longer than five years, if the vehicle runs on the asphalt road, the friction coefficient k is set to be 0.7, or if the vehicle runs on the cement road, the friction coefficient k is set to be 0.65, but the embodiments of present disclosure are not limited thereto. For example, the actual road condition can be inputted into the controller 130 manually, or can be obtained and updated by automatically searching over the Internet by the controller 130 according to the current location of the vehicle, but the embodiments of present disclosure are not limited thereto.

Figure 4:
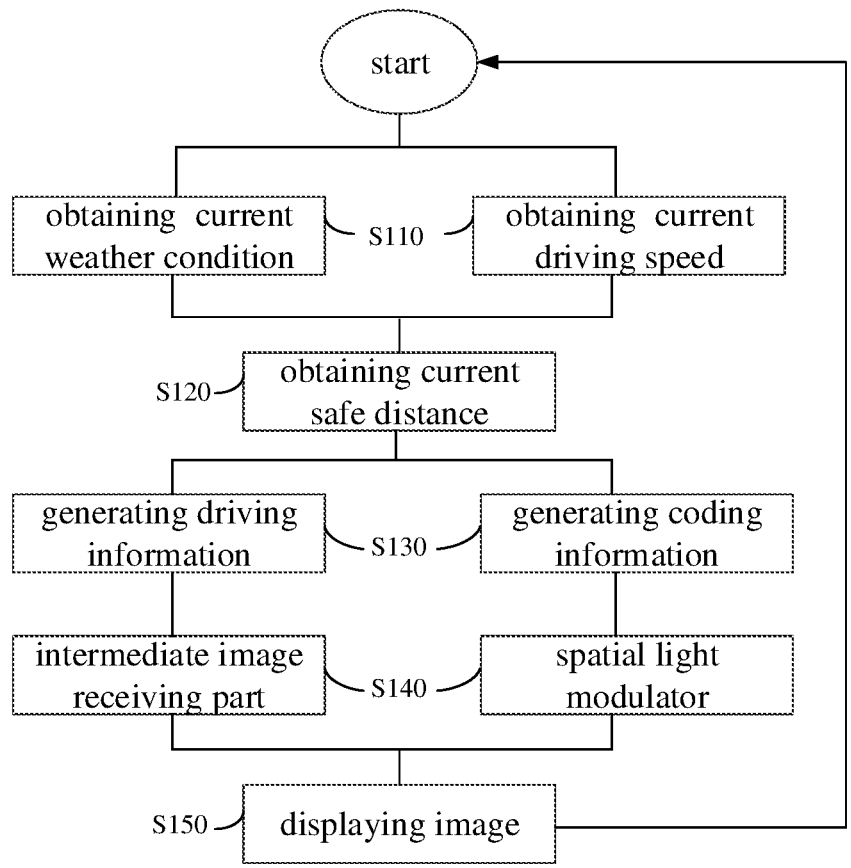
FIG. 4 is an exemplary flow chart of adjusting image display position of an in-vehicle display system.

For example, FIG. 4 is an exemplary flow chart of adjusting image display position of the in-vehicle display system. For example, the flow chart illustrated in FIG. 4 is a method of adjusting the image display position of the in-vehicle display system by taking a case that the image generation device comprises the spatial light modulator and the coherent light source as an example, but the embodiment of present disclosure is not limited thereto. For example, the method of adjusting the image display position of the in-vehicle display system can be realized by the following steps.

Step S110: obtaining a current weather condition and a current driving speed;

Step S120: obtaining a current safe distance.

Step S130: generating driving information and coding information.

Step S140: providing the driving information and the coding information to the intermediate image receiving part and the spatial light modulator, respectively.

Step S150: displaying an image.

For example, in step S110, the current weather condition for example can be inputted manually, or can be obtained through the Internet, the initial value of the current driving speed, for example, can be set to be 20 kilometers per hour, but the embodiment of present disclosure is not limited thereto.

For example, in step S120, the current safe distance can be calculated by the controller 130 according to the current weather condition and the current driving speed. For example, implementations of the controller 130 can be set according to specific implementation demands, and no specific limitations will be given to the embodiment of the present disclosure. For example, the controller 130 can comprise a processor and a memory. The processor, for example, is a central processing unit (CPU), a microprocessor, a PLC (programmable logic the controller), or the like; the memory, for example, can be storage devices of various types, the memory, for example, can be a magnetic storage device or a semiconductor memory device, the memory can be used to store executable instructions, data for the instructions or data generated by the instructions, and the processor can run the executable instructions to realize desired functions. For example, the controller 130 can be a control system (for example, computer) of the vehicle. For another example, functions of the controller 130 can also be realized by a mobile device (a mobile device of the driver or passenger, for example, a mobile phone).

For example, in step S130, firstly, the information regarding the intermediate image receiving position of the intermediate image receiving part 120 and the information regarding the imaging distance of the image generation device 110 (i.e., information regarding the location of presenting the first image outputted by the image generation device 110) can be determined according to the current safe distance, and the intermediate image receiving position of the intermediate image receiving part 120 for example can equal to the imaging distance of the image generation device 110; the corresponding relationship between the safe distance and the intermediate image receiving position/the imaging distance of the image generation device 110, for example, can be determined according to imaging properties of the image transmission device 140 (for example, object distance and image distance) and the corresponding relationship between the image distance of the image transmission device 140 and the safe distance; no further descriptions will be given here. Then the driving information of the intermediate image receiving part 120 can be generated according to information regarding the intermediate image receiving position, and the coding information of the spatial light modulator 111 can be generated according to information regarding the imaging distance of the image generation device 110.

For example, in step S140, the information regarding the intermediate image receiving position and the coding information can be respectively provided to the intermediate image receiving part 120 and the spatial light modulator 111 through wired or wireless means, and no specific limitations will be given here.

For example, in step S150, images (for example, the first image) can be displayed through the following steps: firstly, the controller 130 allows the intermediate image receiving position of the intermediate image receiving part 120 to move to the determined position based on the driving information, the spatial light modulator 111 generates corresponding hologram according to the coding information, the image generation device 110 projects the first image to the intermediate image receiving position according to the diffraction effect of the hologram, such that the first image can be presented at the intermediate image receiving position then, light of the first image presented at the intermediate image receiving position can be incident onto the image transmission device 140, and then transferred to the viewing position 162 of the user, in which the first image is located at the safe distance in front of the vehicle.

For example, because the current safe distance can be updated in real-time based on the current driving speed and the current weather condition during driving of the vehicle, the location of the first image can be updated in real-time according to the safe distance. Therefore, not only frequent adjustment of vision focus position of the user can be avoided, but also the driver can be notified of the change of the driving condition (for example, becoming worse of the weather or increasing of the speed) by the change of the position to the displayed first image, such that the driving safety can be further increased.

For example, in order to further increase the driving safety, the controller 130 can be further configured to determine the safe distance and the intermediate image receiving position of the intermediate image receiving part 120 based on the current driving speed, the current weather condition and the current road condition (for example, congestion condition or traffic jam condition) during driving of the vehicle. For example, in a case that the vehicle is driving on a smooth freeway, the first image can be presented at the safe distance in front of the vehicle. For example, in a case that the vehicle is driving on a congested street, the position to display the first image can be adjusted slightly on the base of the safe distance according to the congestion condition of the street (for example, the first image can be presented at a position around the rear side of the vehicle ahead); for another example, the first image can also be presented at a fixed position around the front of the vehicle, such that the power consumption of the system can be reduced. For example, according to actual implementation demands, the controller 130 can be further configured to determine the safe distance based on other factors (for example, the preference of the driver, the maximum value of the imaging distance of the in-vehicle display system or the like) besides the current driving speed, the current weather condition and the current road condition, no specific limitations will be given to the embodiment of the present disclosure.

Second Embodiment

Figure 5:
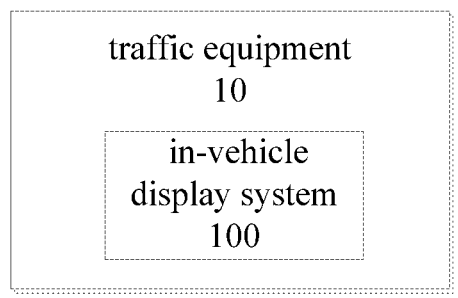
FIG. 5 is a traffic equipment provided by a second embodiment.

For example, the present embodiment provides a traffic equipment 10. For example, as illustrated in FIG. 5, the traffic equipment 10 comprises any one of the exemplary in-vehicle display systems 100 provided by the first embodiment. For example, the controller of the in-vehicle display system 100 is further configured to obtain the vehicle speed. It should be noted that: other necessary components of the traffic equipment 10 can adopt conventional components, are not further described here, and shall not be constructed as the limitation of the embodiments of the present disclosure as well. The traffic equipment can control the position to display the image at least based on the current driving speed, such that the driving safety can be improved.

The traffic equipment can be any suitable traffic equipment, which, for example, can be overland vehicles including various cars, or can be water vehicle including boats, as long as a front window is provided and the images can be projected to the front window through the in-vehicle display system.

The traffic equipment can obtain the current driving speed through the velocimeter (laser velocimeter or radar velocimeter) or the GPS (global position system) equipped within the traffic equipment, and obtain the current weather condition through a pressure sensor, a humidity sensor, a thermometer, or obtain the current weather condition through searching of the current weather condition over corresponding websites, databases and the like via a wireless communication network.

Third Embodiment

Figure 6:
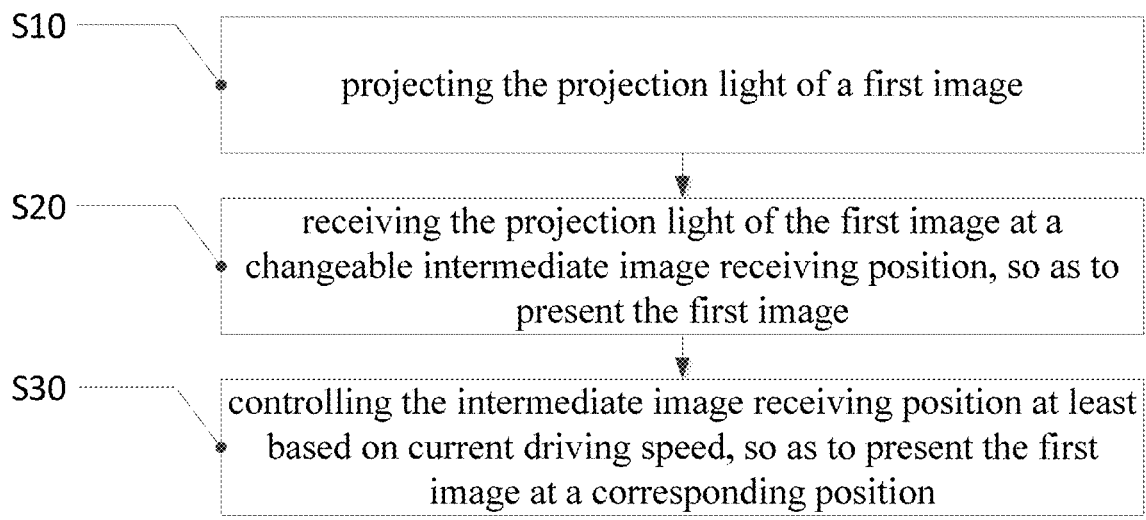
FIG. 6 is an exemplary flow chart of an image display method provided by a third embodiment.

For example, the present embodiment provides an image display method. For example, as illustrated in FIG. 6, the image display method can be realized through the following steps.

Step S10: projecting the projection light of a first image;

Step S20: receiving the projection light of the first image at a changeable intermediate image receiving position, so as to present the first image;

Step S30: controlling the intermediate image receiving position at least based on a current driving speed, so as to present the first image at a different corresponding position.

For example, the image display method can further comprise: transferring the first image presented at the intermediate image receiving position to a viewing position of a user. For example, the method to present the first image at the intermediate image receiving position to the viewing position of the user can refer to the first embodiment; no further descriptions will be given herein.

For example, in step S10, projecting of the projection light of the first image can refer to the first embodiment, and therefore no further descriptions will be given herein.

For example, in step S20, the intermediate image receiving position can be changed by changing the position of the intermediate image receiving part. For example, the method to change the intermediate image receiving position can refer to the first embodiment, and therefore no further descriptions will be given herein.

For example, in step S30, the intermediate image receiving position can be controlled at least based on the current driving speed, the current weather condition and the current road condition during driving of the vehicle. For example, the specific method to control the intermediate image receiving position can refer to the first embodiment, and therefore no further descriptions will be given herein.

Embodiment of the present disclosure provides an in-vehicle display system, a traffic equipment and an image display method, and accordingly the driving safety is improved through controlling of the image display position at least based on current driving speed.

Although detailed description has been given above to the present disclosure with general description and embodiments, it shall be apparent to those skilled in the art that some modifications or improvements may be made on the basis of the embodiments of the present disclosure. Therefore, all the modifications or improvements made without departing from the spirit of the present disclosure shall all fall within the scope of protection of the present disclosure.

What are described above is related to the illustrative embodiments of the disclosure only and not limitative to the scope of the disclosure; the scopes of the disclosure are defined by the accompanying claims.

What is claimed is:

1. An in-vehicle display system, comprising an image generator, an intermediate image receiver and a controller,
   wherein the image generator is configured to project projection light of a first image;
   the intermediate image receiver is configured to receive the projection light of the first image, so as to present the first image, and the intermediate image receiver is further configured to have a changeable intermediate image receiving position; and
   the controller is configured to control the intermediate image receiving position of the intermediate image receiver at least based on a current driving speed, so as to present the first image at a corresponding position, and in response to the current driving speed increasing, the controller increases an optical distance between the intermediate image receiving position of the intermediate image receiver and a position at where the first image is to be presented; or the controller is configured to determine a safe distance in front of the vehicle and control the intermediate image receiving position of the intermediate image receiver at least directly based on the current driving speed, so as to present the first image at the safe distance in front of the vehicle,
   the intermediate image receiver comprises a plurality of image receiving elements that are superimposed together, the controller is configured to control a number of image receiving elements to which a driving voltage is applied among the plurality of image receiving elements, the projection light of the first image received by the intermediate image receiver does not present the first image at a position of an image receiving element to which no driving voltage is applied among the plurality of image receiving elements, thereby adjusting the intermediate image receiving position of the intermediate image receiver.

2. The in-vehicle display system according to claim 1, wherein
   the controller is configured to control the intermediate image receiving position of the intermediate image receiver at least based on the current driving speed, a current weather condition and a current road condition.

3. The in-vehicle display system according to claim 1, further comprising an image transmitter,
   wherein the image transmitter is configured to transfer the first image to a viewing position of a user.

4. The in-vehicle display system according to claim 3, further comprising a plane mirror, wherein the plane mirror is arranged in a transmission path of the first image, and is configured to reflect light of the first image received by the plane mirror onto the image transmitter.

5. The in-vehicle display system according to claim 3, wherein the image transmitter is configured to change a distance between the user and the first image viewed by the user based on an optical distance between the image transmitter and the intermediate image receiving position.

6. The in-vehicle display system according to claim 5, wherein the image transmitter comprises at least one concave mirror.

7. The in-vehicle display system according to claim 6, wherein the image transmitter further comprises a partially reflective and partially transparent element; and
   the partially reflective and partially transparent element is configured to transfer the first image outputted by the concave mirror to the viewing position of the user.

8. The in-vehicle display system according to claim 1, wherein an imaging position of the image generator is adjustable.

9. The in-vehicle display system according to claim 8, wherein the image generator comprises:
   a spatial light modulator, which is configured to generate a hologram corresponding to the first image to be displayed; and
   a coherent light source, which is configured to allow output light of the coherent light source to be incident onto the spatial light modulator, so as to generate the first image at the intermediate image receiving position based on diffraction effect of the hologram.

10. The in-vehicle display system according to claim 1, wherein the intermediate image receiver comprises an image receiving plate; and
    the controller is further configured to change the intermediate image receiving position through changing a position of the image receiving plate.

11. A traffic equipment, comprising the in-vehicle display system according to claim 1, wherein the controller is further configured to obtain the current driving speed.

12. The in-vehicle display system according to claim 1, wherein
    each of the plurality of image receiving elements comprises a polymer dispersed liquid crystal layer, transparent conductive layers provided at both sides of the polymer dispersed liquid crystal layer, and insulation substrates each provided at a side of the polymer dispersed liquid crystal layer far away from the polymer dispersed liquid crystal layer.

13. An image display method, comprising:

projecting projection light of a first image;

receiving the projection light of the first image at a changeable intermediate image receiving position, so as to present the first image; and controlling the intermediate image receiving position of the intermediate image receiver at least based on a current driving speed, so as to present the first image at a corresponding position, and in response to the current driving speed increasing, increasing an optical distance between the intermediate image receiving position of the intermediate image receiver and a position at where the first image is to be presented; or determining a safe distance in front of the vehicle and controlling the intermediate image receiving position of the intermediate image receiver at least directly based on the current driving speed, so as to present the first image at the safe distance in front of the vehicle, wherein the intermediate image receiver comprises a plurality of image receiving elements that are superimposed together, the controller is configured to control a number of image receiving elements to which a driving voltage is applied among the plurality of image receiving elements, the projection light of the first image received by the intermediate image receiver does not present the first image at a position of an image receiving element to which no driving voltage is applied among the plurality of image receiving elements, thereby adjusting the intermediate image receiving position of the intermediate image receiver.

14. The image display method according to claim 13, wherein the intermediate image receiving position is controlled at least based on the current driving speed, a current weather condition and a current road condition.

15. The image display method according to claim 14, further comprising transferring the first image presented at the intermediate image receiving position to a viewing position of a user.

16. The image display method according to claim 15, further comprising:

changing the intermediate image receiving position through changing a position of an intermediate image receiver.

17. An in-vehicle display system, comprising: an image generator, an intermediate image receiver, a processor, and a memory, wherein the memory is stored with computer program instructions executable by the processor, upon the processor running the computer program instructions, the in-vehicle display system performs a following method comprising:

controlling the image generator to project projection light of a first image;

controlling the intermediate image receiver to receive the projection light of the first image at a changeable intermediate image receiving position, so as to present the first image; and controlling the intermediate image receiving position of the intermediate image receiver at least based on a current driving speed, so as to present the first image at a corresponding position, and in response to the current driving speed increasing, increasing an optical distance between the intermediate image receiving position of the intermediate image receiver and a position at where the first image is to be presented; or determining a safe distance in front of the vehicle and controlling the intermediate image receiving position of the intermediate image receiver at least directly based on the current driving speed, so as to present the first image at the safe distance in front of the vehicle, wherein the intermediate image receiver comprises a plurality of image receiving elements that are superimposed together, the controller is configured to control a number of image receiving elements to which a driving voltage is applied among the plurality of image receiving elements, the projection light of the first image received by the intermediate image receiver does not present the first image at a position of an image receiving element to which no driving voltage is applied among the plurality of image receiving elements, thereby adjusting the intermediate image receiving position of the intermediate image receiver.

18. The in-vehicle display system according to claim 17, wherein the intermediate image receiving position of the intermediate image receiver is controlled at least based on the current driving speed, a current weather condition and a current road condition.

19. The in-vehicle display system according to claim 18, further comprising an image transmitter, wherein upon the processor running the computer program instructions, the in-vehicle display system performs the method further comprising:

controlling the image transmitter, so as to transfer the first image to a viewing position of a user.

* * * * *